United States Patent [19] [11] 3,912,734
Giller et al. [45] Oct. 14, 1975

[54] METHOD FOR PREPARING
N₁-(2'-FURANIDYL)-AND
N₁-(2'-PYRANIDYL) URACILS

[76] Inventors: Solomon Aronovich Giller, ulitsa Pernavas, 10, kv. 76; Regina Abramovna Zhuk, ultisa Gorkogo 77, kv. 20; Anna Eduardovna Berzin, ulitsa Raunas 35/2, kv. 29; Laima Avgustovna Sherin, ulitsa Raunas 43, kv. 43, all of Riga; Arvid Avgustovich Lazdinsh, ulitsa Mendeleeva 1, kv. 31, Olaine, all of U.S.S.R.

[22] Filed: June 1, 1973

[21] Appl. No.: 366,215

[30] Foreign Application Priority Data
Nov. 20, 1972 U.S.S.R. .......................... 1848519

[52] U.S. Cl. ........... 260/248 AS; 260/260; 424/249; 424/251
[51] Int. Cl. ....................... C07d 55/10; C07d 51/36
[58] Field of Search ........................ 260/260, 248 AS

[56] References Cited
UNITED STATES PATENTS
3,352,849 11/1967 Shen et al. ...................... 260/248 X

*Primary Examiner*—John M. Ford
*Attorney, Agent, or Firm*—Waters, Schwartz & Nissen

[57] ABSTRACT
A method for preparing N₁-(2'-furanidyl)- and N₁-(2'-pyranidyl) uracils having the general formula

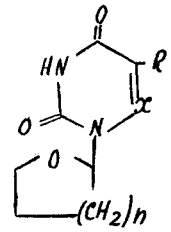

where R is hydrogen, methyl, trihalomethyl, or a halogen, X is CH or N, and $n$ is 1 or 2, characterized in that 2,4-bis (trimethylsilyl) derivatives of uracils having the general formula

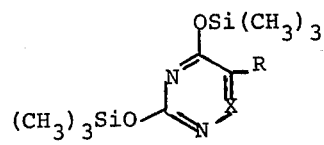

where R is hydrogen, methyl, trihalomethyl or a halogen, X is CH or N, are treated with a 2-substituted cyclic ester having the general formula

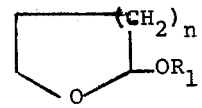

where R₁ is acyl or alkyl, and $n$ is 1 or 2, in the presence of Friedel-Crafts catalysts in a medium of an organic solvent inactive with respect to the said starting components.

4 Claims, No Drawings

METHOD FOR PREPARING $N_1$-(2'-FURANIDYL)- AND $N_1$-2(2'-PYRANIDYL) URACILS

The invention relates to a method for preparing uracils, and more particularly it relates to a method for preparing $N_1$-(2'-furanidyl)- and $N_1$-(2'-pyranidyl) uracils having the general formula

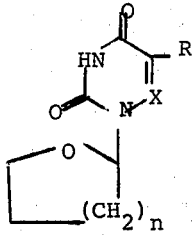

where R is hydrogen, methyl, trihalomethyl, or a halogen, X is CH or N, and $n$ is 1 or 2.

The representatives of said group of compounds have physiological activity and are used in medicine. For example, $N_1$-(2'-furanidyl)-5-fluorouracil is an active principle of an anti-tumour preparation known as Ftorafur. This preparation is widely used for treating cancer of the gastro-intestinal tract and of the mammary gland.

Known in the prior art is a method for preparing these compounds, consisting in the action of 2,4-bis(-trimethylsilyl) derivatives of uracil on 2-chlorofuranidine or 2-chloropyranidine (C. A. Giller, R. A. Zhuk, M. Y. Lidak, A. A. Zinderman, British Pat. No. 1,168,391).

The disadvantages of this method are the instability of 2-chlorofuranidine and 2-chloropyranidine, and the low temperatures of the process, namely, from −20°C to −10°C.

The object of this invention is to work out a process for synthesizing $N_1$-(2'-furanidyl)- and $N_1$-(2'-pyranidyl) uracils convenient for application on an industrial scale.

These and other objects of the invention have been attained in a method for preparing $N_1$-(2'-furanidyl)- and $N_1$-(2'-pyrinidyl) uracils having the general formula

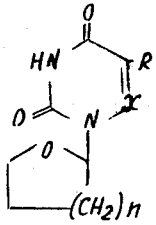

where R is hydrogen, methyl, trihalomethyl, or a halogen, X is CH or N, and $n$ is 1 or 2, which, according to the invention, consists in that 2,4-bis(trimethylsilyl) derivatives of uracils having the general formula

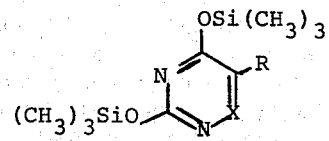

where R, X are as specified above, are reacted with a 2-substituted cyclic ester having the general formula

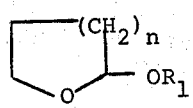

where $R_1$ is acyl or alkyl, and $n$ is from 1 to 2, in the presence of Friedel-Crafts catalysts in a medium which is an organic solvent inactive with respect to the starting components.

The interaction between the said components can be expressed by the following scheme

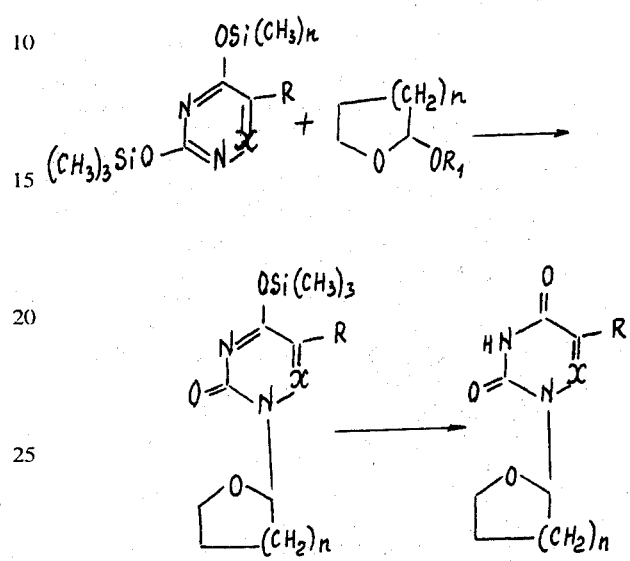

where R, X, $R_1$ and $n$ are as specified above.

The use of 2-substituted cyclic ethers, having the above-specified formula, as a starting component, has enabled the preparation of $N_1$-(2'-furanidyl)- and $N_1$-(2-pyranidyl) uracils of good quality and in higher yields (10–15 per cent higher compared with the known process), the process for their manufacture and isolation being significantly simplified.

The method for preparing the said uracils consists in the following.

To a solution of 2,4-bis(trimethylsilyl) derivative of uracil having the above-specified general formula in an organic solvent are added a 2-substituted cyclic ether of the above-specified general formula and, slowly dropwise, and with stirring, a solution of the said catalyst in an organic solvent. The reaction continues for 1–2 hours at room temperature, or at an elevated temperature, (depending on the starting components), and at normal atmospheric pressure. The solvent is then distilled in vacuo from the reaction mixture, and ethyl alcohol is added to the residue to remove the remaining trimethylsilyl group. The mixture is stirred for two hours and the precipitate of $N_1$-(2'-furanidyl)- or $N_1$-(2'-pyranidyl) uracil is allowed to settle, separated on a filter and washed with a small quantity of cool ethyl alcohol. The preparation is finally isolated by re-crystallization from chloroform.

$SnCl_4$, $TiCl_4$, $ZnCl_2$, $AlCl_3$, $SiCl_4$, $BF_3 \cdot (C_2H_5)_2O$ and other Friedel-Crafts catalysts are used to catalyze the process.

1,2-dichloroethane, chloroform, methylene chloride, benzene, acetonitrile dimethylformamide and other organic solvents can be used as solvents for the process according to the invention.

The catalyst that should preferably be used in the process is $SnCl_4$, and the preferable organic solvent is methylene chloride or 1,2-dichloroethane.

The molar ratio of 2,4-bis(trimethylsilyl)-derivatives of uracil, to said 2-substituted cyclic ether and to the catalyst can be selected within the range of 1:1 – 2:0.5–2, however, the optimum ratio is 1:1.5:0.7.

For a better understanding of the invention, the following examples of its practical embodiment are given by way of illustration.

EXAMPLE 1

$N_1$-(2'-furanidyl)-5-methyluracil

Into a round-bottomed flask provided with a mechanical stirrer, a thermometer, a dropping funnel and a calcium chloride tube are, placed 8.1 g (0.03 mole) of 2,4-bis(trimethylsilyl)-5-methyluracil, 5.1 g (0.039 mole) of 2-acetoxyfuranidine and 30 ml of anhydrous dichloroethane. A solution of 5.2 g (2.3 ml, 0.02 mole) of tin tetrachloride in 10 ml of dichloroethane is added with stirring, and the reaction mixture is kept for two hours at room temperature. The solvent is then distilled in vacuo and 18 ml of ethyl alcohol are added dropwise. The mixture is stirred for 30 minutes at room temperature, and the precipitate is then separated. The resultant product is $N_1$-(2'-furanidyl)-5-methyluracil in the quantity of 5.0 g, which is 85 per cent of theory, as calculated with reference to 2,4-bis(trimethylsilyl)-5-methyluracil. This is a white crystalline substance melting at 182° – 184°C (chloroform).

$C_9H_{12}O_3N_2$: Found, in per cent: C, 55.31; H, 6.28; N, 14.18.

Calculated, in per cent: C, 55.09; H, 6.17; N, 14.28.

The procedure in the Examples that follow is the same as described in Example 1.

EXAMPLE 2

$N_1$-(2'-furanidyl)-5-fluorouracil 8.2 g (0.03 mole) of 2,4-bis(trimethylsilyl)-5-fluorouracil are reacted with 5.1 g (4.7 ml, 0.039 mole) of 2-acetoxyfuranidine in a medium of methylene chloride in the presence of 5.2 g (2.3 ml, 0.02 mole) of tin tetrachloride to yield 4.9 g (82 per cent of theory) of $N_1$-(2'-furanidyl)-5-fluorouracil which is a white crystalline substance melting at 166°–168°C (chloroform).

$C_8H_9O_3N_2F$: Found, in per cent: C, 48.24; H, 4.73; N, 14.25.

Calculated, in per cent: C, 47.99; H, 4.50; N, 14.00.

EXAMPLE 3

$N_1$-(2'-furanidyl)-5-bromouracil 10.1 g (0.03 mole) of 2,4-bis(trimethylsilyl)-5-bromouracil are reacted with 5.1 g (4.7 ml, 0.039 mole) of 2-acetoxyfuranidine in a medium of chloroform in the presence of 5.2 g (2.3 ml, 0.02 mole) of tin tetrachloride for 2 hours at a temperature from 35° to 40°C to yield 5.0 g (64 per cent of theory) of $N_1$-(2'-furanidyl)-5-bromouracil, which is a white crystalline substance melting at 208°–210°C (decomposition), (chloroform).

$C_8H_9O_3N_2Br$: Found, in per cent: C, 36.28; H 3.63; N, 11.01;

Calculated, in per cent: C, 36.76; H, 3.44; N, 10.73.

EXAMPLE 4

$N_1$-(2'-furanidyl)-5-trifluoromethyluracil 9.7 g (0.03 mole) of 2,4-bis(trimethylsilyl)-5-trifluoromethyluracil are reacted with 5.1 g (4.7 ml, 0.039 mole) of 2-acetoxyfuranidine in a medium of methylene chloride in the presence of 5.2 g (2.3 ml, 0.02 mole) of tin tetrachloride for 2 hours at room temperature to yield 6.0 g (80 per cent of theory) of $N_1$-(2'-furanidyl)-5-trifluoromethyluracil, which is a white crystalline substance melting at 206°–208°C (chloroform).

$C_9H_9N_2O_3F_3$: Found, in per cent: C, 43.18; H, 3.51; N, 11.00.

Calculated, in per cent: C, 43.21; H, 3.63; N, 11.20.

EXAMPLE 5

$N_1$-(2'-furanidyl)-6-azauracil 7.7 g (0.03 mole) of 2,4-bis(trimethylsilyl)-6-azauracil are reacted with 5.1 g (4.7 ml, 0.039 mole) of 2-acetoxyfuranidine in a medium of dichloroethane in the presence of 5.2 g (2.3 ml, 0.02 mole) of tin tetrachloride for 2 hours at room temperature to yield 3.4 g (62 per cent of theory) of $N_1$-(2'-furanidyl)-6-azauracil, which is a white crystalline substance, melting at 121°–123°C (carbon tetrachloride).

$C_7H_9N_3O_3$: Found, in per cent: C, 45.82; H, 4.78; N, 23.25.

Calculated, in per cent: C, 45.90; H, 4.95; N, 22.94.

EXAMPLE 6

$N_1$-(2'-pyranidyl)-5-fluorouracil 8.2 g (0.03 mole) of 2,4-bis(trimethylsilyl)-5-fluorouracil are reacted with 4.5 g (4.1 ml, 0.039 mole) of 2-methoxytetrahydropyrane in a medium of chloroform in the presence of 5.2 g (2.3 ml, 0.02 mole) of tin tetrachloride for 2 hours at a temperature of 35° to 40°C to yield 3.5 g (55 per cent of theory) of $N_1$-(2'-pyranidyl)-5-fluorouracil, which is a white crystalline substance melting at 172° – 173°C (chloroform).

$C_9H_{11}N_2O_3F$: Found, in per cent: C, 50.64; H, 5.44; N, 13.13.

Calculated in per cent: C, 50.46; H, 5.14; N, 13.08.

EXAMPLE 7

$N_1$-(2'-furanidyl)-uracil 7.7 g (0.03 mole) of 2,4-bis(trimethylsilyl)-6-azauracil are reacted with 5.1 g (4.7 ml, 0.039 mole) of 2-acetoxyfuranidine in a medium of dichloroethane in the presence of 3.4 g (2.3 ml, 0.02 mole) of silicon tetrachloride for 2 hours at room temperature to yield 1.9 g (35 per cent of theory) of $N_1$-(2'-furanidyl)-uracil, which is a white crystalline substance, melting at 102°–104°C (ethanol).

$C_8H_{10}N_2O_3$: Found, in per cent: C, 52.17; H, 5.60; N, 15.68.

Calculated, in per cent: C, 52.74; H, 5.53; N, 15.38.

EXAMPLE 8

$N_1$-(2'-pyranidyl)-5-bromo-6-azauracil 10.1 g (0.03 mole) of 2,4-bis(trimethylsilyl)-5-bromo-6-azauracil are reacted with 7.8 g (7.4 ml, 0.06 mole) of 2-ethoxy pyranidine in a medium of dichloroethane in the presence of 4.1 g (0.03 mole) of zinc chloride for two hours at room temperature to yield 2.5 g (30 per cent of theory) of $N_1$-(2'-pyranidyl)-5-bromo-6-azauracil, which is a white crystalline substance, melting at 195°–197°C (chloroform).

$C_8H_{10}N_3O_3Br$: Found, in per cent: C, 34.69; H, 3.85; N, 14.90.

Calculated, in per cent: C, 34.80; H, 3.65; N, 15.22.

What is claimed is:

1. A method for the production of a compound of the formula

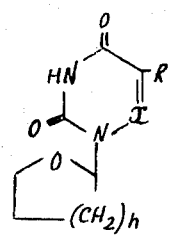

where R is selected from the group consisting of hydrogen, methyl, trihalomethyl, and a halogen, X is selected from the group consisting of CH and N, and $n$ is from 1 to 2, consisting in reacting a 2,4-bis(trimethylsilyl) derivative of a uracil having the formula

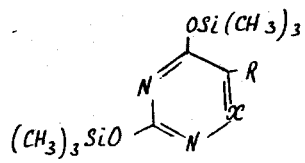

where R is selected from the group consisting of hydrogen, methyl, trihalomethyl, and a halogen, X is selected from the group consisting of CH and N, with a 2-substituted cyclic ether having the formula

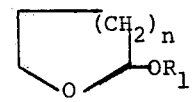

where $R_1$ is selected from the group consisting of acetyl and alkyl, and $n$ is from 1 to 2, in the presence of a Friedel-Crafts catalyst in a medium of an organic solvent inactive with respect to the said starting components.

2. A method according to claim 1, in which the molar ratio of the 2,4-bis(trimethylsilyl) derivative to the 2-substituted cyclic ether and to the catalysts is selected within the range of 1:1–2:0.5–2.

3. A method according to claim 1, in which the solvent is selected from the group consisting of dichloroethane, chloroform, methylene chloride, benzene and dimethyl formamide.

4. A method according to claim 1, in which the catalyst is selected from the group consisting of $SnCl_4$, $TiCl_4$, $ZnCl_2$, $AlCl_3$, $SiCl_4$, $BF_3 \cdot (C_2H_5)_2O$.

* * * * *